(12) United States Patent
Lee

(10) Patent No.: US 6,952,473 B1
(45) Date of Patent: Oct. 4, 2005

(54) SYSTEM AND METHOD FOR ECHO ASSESSMENT IN A COMMUNICATION NETWORK

(75) Inventor: Yueh-ju Lee, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 274 days.

(21) Appl. No.: 10/304,147

(22) Filed: Nov. 25, 2002

(51) Int. Cl.[7] ............................................. H04M 9/08
(52) U.S. Cl. ...................... 379/406.01; 379/406.02; 379/406.04; 379/406.05; 379/406.06; 379/406.03
(58) Field of Search .................. 379/406.01–406.16

(56) References Cited

U.S. PATENT DOCUMENTS

| | | | |
|---|---|---|---|
| 6,618,481 B1 * | 9/2003 | Schmidt | ............... 379/406.14 |
| 6,640,248 B1 * | 10/2003 | Jorgensen | .................. 709/226 |
| 6,724,736 B1 * | 4/2004 | Azriel | ....................... 370/286 |
| 2002/0075818 A1 * | 6/2002 | Matsuo | |
| 2003/0231763 A1 * | 12/2003 | Lilliiott et al. | |
| 2004/0022394 A1 * | 2/2004 | Michaelis | |
| 2004/0052209 A1 * | 3/2004 | Ortiz | |

OTHER PUBLICATIONS

ITU-T G.131 standard, "Control of talker echo.", Aug. 1996.
U.S. Appl. No. 10/251,702, "System and Method for Voice Quality Analysis," filed by Yueh-ju Lee et al., Sep. 19, 2002.

* cited by examiner

*Primary Examiner*—Sinh Tran
*Assistant Examiner*—Ramnandan Singh
(74) *Attorney, Agent, or Firm*—Baker Botts L.L.P.

(57) ABSTRACT

A method includes receiving a plurality of packets from at least two voice packet streams. The method also includes generating at least two voice signals using the plurality of packets. Each voice signal is associated with one of the voice packet streams. In addition, the method includes identifying an echo of one of the voice signals in at least one other of the voice signals.

36 Claims, 5 Drawing Sheets

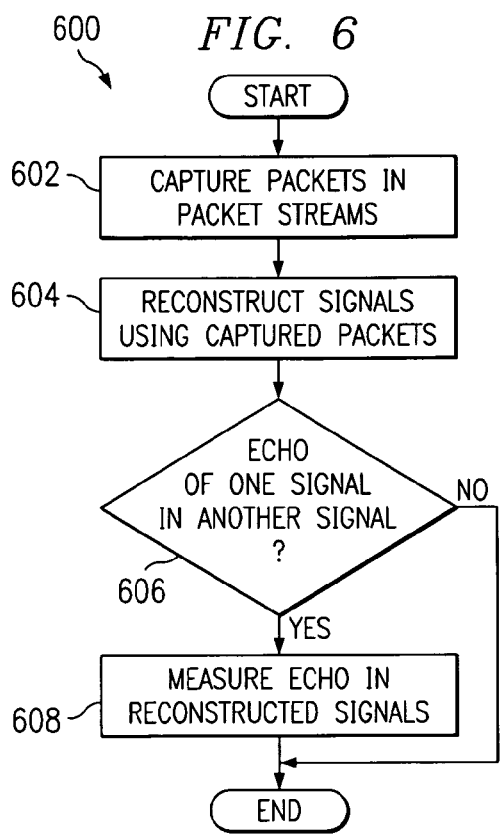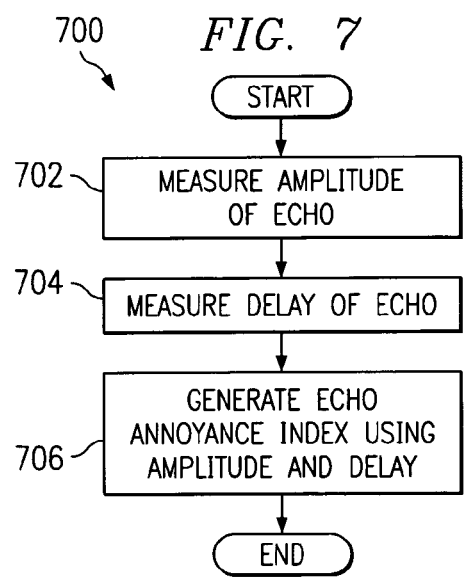

SYSTEM AND METHOD FOR ECHO ASSESSMENT IN A COMMUNICATION NETWORK

TECHNICAL FIELD

This disclosure relates generally to communication systems, and more particularly to a system and method for echo assessment in a communication network.

BACKGROUND

A typical packet-based communication network can support voice communication sessions between two or more participants. For example, the network could support a voice telephone call by transporting Internet Protocol (IP) packets between a calling party and a called party. One or more parties to the telephone call may notice echo occurring during the call. As an example, echo may occur when one party to the telephone call speaks into a mouthpiece of a telephone and the speaking party later hears his or her own voice in an earpiece of the telephone.

SUMMARY

This disclosure describes a system and method for echo assessment in a communication network.

In one embodiment, a method includes receiving a plurality of packets from at least two voice packet streams. The method also includes generating at least two voice signals using the plurality of packets. Each voice signal is associated with one of the voice packet streams. In addition, the method includes identifying an echo of one of the voice signals in at least one other of the voice signals.

In a particular embodiment, a network is tapped at one or more locations to receive the plurality of packets, such as at one or more of a network node, an endpoint, and a wireless link. In another particular embodiment, one or more endpoints generate the at least two voice packet streams without using test equipment at the one or more endpoints.

One or more technical features may be present according to various embodiments of this disclosure. Particular embodiments of this disclosure may exhibit none, some, or all of the following features depending on the implementation. For example, in one embodiment, an echo assessment module may monitor one or more communication sessions and capture packets associated with the communication sessions. The echo assessment module may analyze the packets and assess an echo annoyance index experienced by one or more users during a communication session. The identified echo annoyance index can then be used in any suitable manner, such as to make adjustments to the network. By allowing the echo assessment module to identify the echo annoyance index associated with a communication session, this may help to identify and resolve problems associated with the network. Also, because the echo assessment module may be coupled to the network at a variety of locations, problems with echo in particular portions of the network may be isolated and identified. In addition, the echo assessment module may perform its task without requiring that a device be provided to introduce test signals into the network, which simplifies the analysis process.

Other technical features may be readily apparent to one skilled in the art from the following figures, descriptions, and claims.

BRIEF DESCRIPTION OF THE DRAWINGS

For a more complete understanding of this disclosure and its advantages, reference is now made to the following description, taken in conjunction with the accompanying drawings, in which:

FIG. 6 illustrates an example method for echo assessment in a communication network; and FIG. 7 illustrates an example method for classifying echo in a communication network.

DETAILED DESCRIPTION OF EXAMPLE EMBODIMENTS

Figure 1:
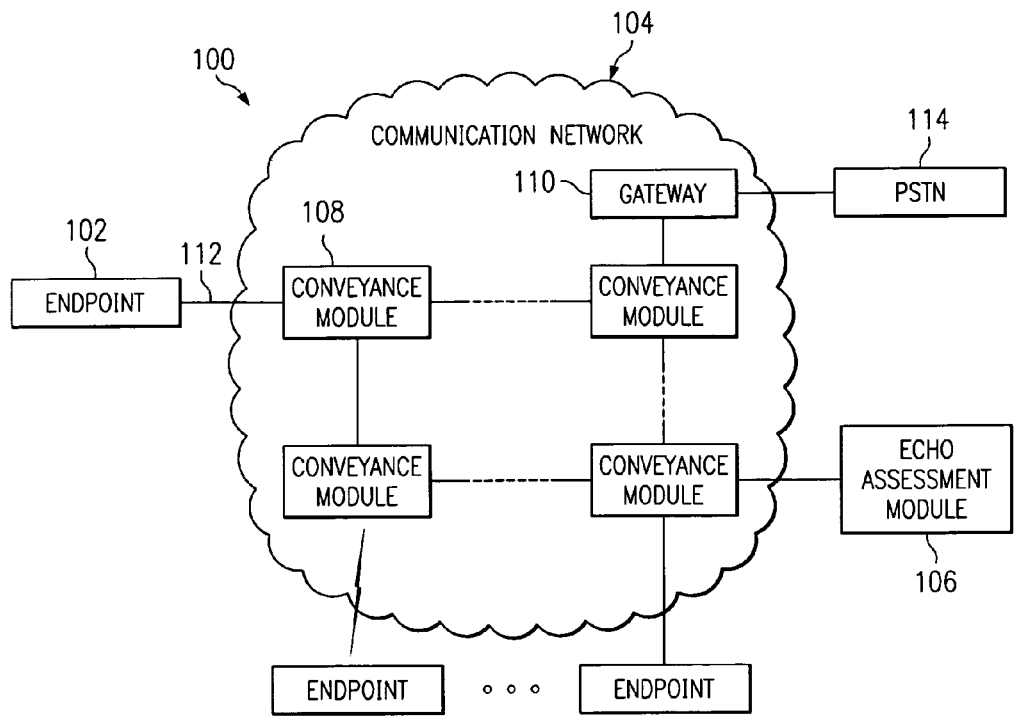
FIG. 1 illustrates an example communication system.

FIG. 1 illustrates an example communication system 100. In the illustrated embodiment, system 100 includes endpoints 102, a network 104, and an echo assessment module 106. Other embodiments of system 100 may be used without departing from the scope of this disclosure.

In one aspect of operation, at least some of the endpoints 102 generate and communicate voice data through network 104. For example, two endpoints 102 may be involved in a communication session, such as a telephone call, where each endpoint 102 transmits and receives voice information over network 104. Echo assessment module 106 monitors one or more communication sessions in system 100 and identifies the echo annoyance index experienced by a user during a monitored session. In this document, the phrase "echo annoyance index" refers to any value that identifies or is otherwise associated with the amount of echo that is noticeable by a user involved in a communication session. For example, the echo annoyance index may identify the level of annoyance that the echo is likely to cause to users of system 100. The echo annoyance index can then be used in any suitable manner, such as to make adjustments to network 104.

In the illustrated embodiment, each endpoint 102 communicates with network 104. Endpoint 102 may include any communication device for generating voice data, storing voice data, sending voice data to network 104, receiving voice data from network 104, and/or converting voice data to audible sounds. For example, endpoint 102 could represent a wireline telephone, a wireless telephone, a voice-capable personal computer, or a voice-capable personal digital assistant. If an endpoint 102 generates voice data based on audible sounds of a user, endpoint 102 typically includes a microphone to convert the audible sounds into electrical signals, an encoder to convert the electrical signals to voice data, and a processor executing logical instructions to group the voice data into packets and to communicate the packets over network 104. If endpoint 102 generates audible sounds based on voice data, endpoint 102 typically includes a processor executing logical instructions to receive voice packets from network 104 and depacketize the voice data in the packets, a decoder to convert the voice data to electrical signals, and a speaker to convert the electrical signals to audible sounds. In a particular embodiment, endpoints 102 are telephones that utilize Internet Protocol (IP) telephony techniques. In this document, the term "packet" refers to IP packets, frame relay frames, Asynchronous Transfer Mode (ATM) cells, or any other suitable segments of information. Also, the phrase "voice packet stream" refers to a succession of related packets from an endpoint 102.

Endpoints 102 are coupled to network 104 by links 112. In this document, the term "couple" refers to any direct or indirect physical, logical, virtual, or other types of communication between two or more components, whether or not those components are in physical contact with one another. Link 112 may represent any suitable interface, such as wires, cables, fiber-optic cables, microwave channels, infrared channels, or any other type of wireline or wireless path for conveying data.

Network 104 facilitates communication between components coupled to network 104. For example, network 104 may communicate packets containing voice data between network addresses. Network 104 may include one or more local area networks (LANs), metropolitan area networks (MANs), wide area networks (WANs), all or a portion of a global network such as the Internet, or any other communication system or systems at one or more locations. Network 104 may also operate according to any appropriate type of protocol or protocols, such as Ethernet, IP, X.25, frame relay, or any other packet data protocol. Network 104 may further support the conveyance of non-voice data packets between endpoints 102 and/or other devices.

In the illustrated example, network 104 includes conveyance modules 108 and a gateway 110. Conveyance module 108 represents a network node that facilitates the communication of packets through network 104. Conveyance module 108 may represent a switch, router, bridge, voice gateway, call manager, transceiver, hub, and/or any other type of device for conveying data packets.

Gateway 110 facilitates communication between network 104 and a public switched telephone network (PSTN) 114. For example, gateway 110 may convert voice data packets from network 104 to a format suitable for PSTN 114. Gateway 110 may also convert voice data from PSTN 114 to a format suitable for communication over network 104. In this way, endpoints 102 may operate with standard telephony devices.

Figure 2:
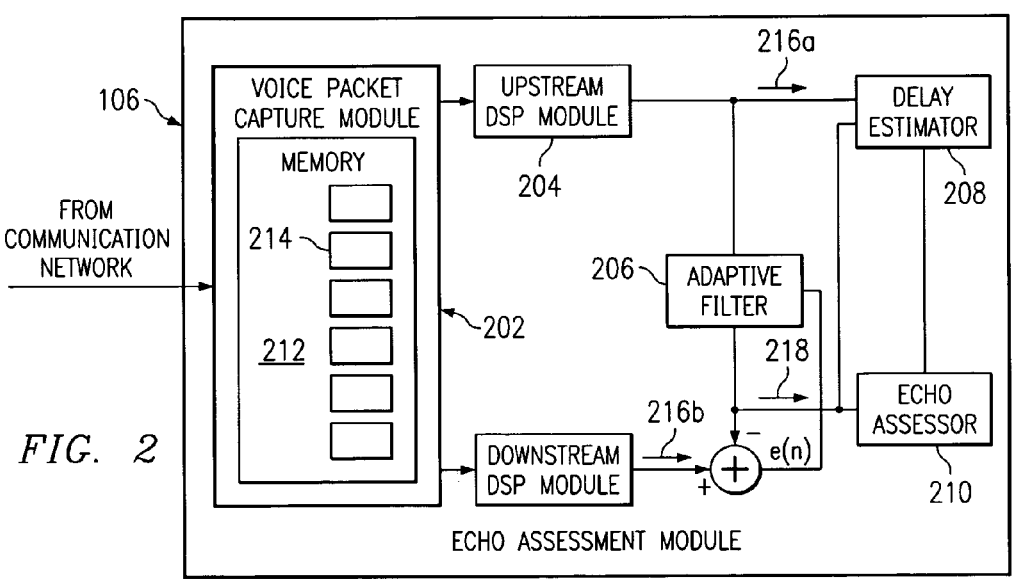
FIG. 2 illustrates an example echo assessment module.

In the illustrated embodiment, echo assessment module 106 is coupled to a conveyance module 108. Echo assessment module 106 receives packets from two or more voice packet streams being conveyed by conveyance module 108. Echo assessment module 106 analyzes the received packets and identifies the echo annoyance index associated with the voice packet streams. Echo assessment module 106 may include any hardware, software, firmware, or combination thereof for identifying echo annoyance indexes in communication sessions. Echo assessment module 106 could, for example, represent a Linux-based personal computer with an Ethernet port. One example of an echo assessment module 106 is shown in FIG. 2, which is described below.

Echo assessment module 106 may use any suitable technique to receive packets from voice packet streams. For example, echo assessment module 106 could tap a shared medium, such as an Ethernet connection or a wireless connection. Once the medium is tapped, echo assessment module 106 may capture and store packets traveling across the medium and the packets' arrival characteristics. The arrival characteristics may include the time of arrival, the order of arrival, and/or any other appropriate characteristics.

After storing the packets, echo assessment module 106 may determine which packets to analyze. For example, echo assessment module 106 may examine the destination address of the packets, the origination address of the packets, the arrival port of the packets, the type of data conveyed by the packets, and/or any other appropriate indicia to select packets to analyze. As particular examples, echo assessment module 106 may look for packets destined for a specific endpoint 102, for an endpoint 102 on a specific local area network, or for an endpoint 102 on a specific virtual LAN (VLAN).

Once a sufficient number of packets of interest have been captured or at any other suitable time, echo assessment module 106 analyzes the captured packets and performs an echo assessment. For example, echo assessment module 106 may extract the voice data contained in the captured packets and recreate audio signals using the voice data. An echo represents part of an original signal that appears later in another signal. The echo may, for example, represent part of an outgoing signal that later reappears as part of an incoming signal. Echo assessment module 106 compares the recreated audio signals to identify any echo signals. For example, echo assessment module 106 may determine whether a portion of one recreated audio signal is contained in another of the recreated audio signals.

Figure 3:
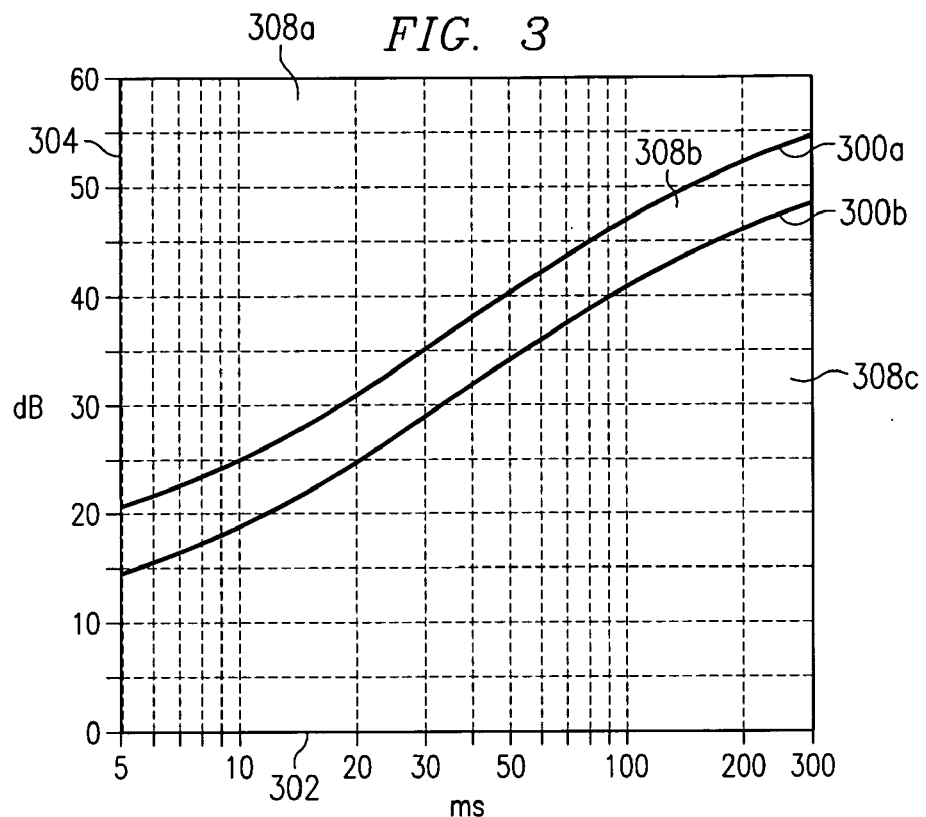
FIG. 3 illustrates example amplitude-delay curves used to identify an echo annoyance index.

If an echo signal is identified, echo assessment module 106 identifies the echo annoyance index associated with the recreated audio signals. In one embodiment, echo assessment module 106 measures the amplitude of the echo signal and the delay between the original signal and the echo signal. In a particular embodiment, echo assessment module 106 identifies the echo annoyance index using amplitude-delay curves provided by the International Telecommunication Union—Telecommunications (ITU-T) G.131 recommendation. Example amplitude-delay curves are shown in FIG. 3, which is described below. Results of the analysis, such as an echo annoyance index or other appropriate data, may be conveyed to a user, conveyed to another component of system 100, stored for later use, or used in any other suitable manner.

While FIG. 1 shows echo assessment module 106 coupled to a conveyance module 108, echo assessment module 106 could be used in other locations in system 100. For example, echo assessment module 106 could be coupled to an endpoint 102. Echo assessment module 106 could also tap into a wireless link 112. The location where echo assessment module 106 is coupled to network 104 may determine which voice packet streams can be monitored. As an example, if echo assessment module 106 is coupled to a conveyance module 108, echo assessment module 106 can monitor the voice packet streams for an entire subnetwork in system 100. If echo assessment module 106 is coupled to an endpoint 102 or is tapping a wireless link 112, echo assessment module 106 may be able to monitor voice packet streams coming from and/or going to a particular endpoint 102. In a particular embodiment, echo assessment module 106 may be coupled to communication system 100 at any of a variety of points, such as conveyance modules 108, links 112, endpoints 102, or gateways 110, allowing enhanced location and/or identification of problems with echo in system 100.

Although FIG. 1 illustrates one example of a communication system 100, various changes may be made to system 100, and other embodiments may include fewer, more, and/or a different arrangement of components. For example, gateway 110 could be omitted in system 100. Also, one, some, or all of endpoints 102 and echo assessment module 106 may be part of network 104. Further, echo assessment module 106 may form part of a conveyance module 108, an endpoint 102, a gateway 110, or other component. In addition, some embodiments may include other devices, such as non-voice-enabled computers, servers, or workstations, that use network 104 to convey data.

FIG. 2 illustrates an example echo assessment module 106. In the illustrated example, echo assessment module 106 includes a voice packet capture module 202, digital signal processor (DSP) modules 204, an adaptive filter 206, a delay estimator 208, and an echo assessor 210. Other embodiments of echo assessment module 106 may be used without departing from the scope of this disclosure.

Voice packet capture module 202 receives packets from network 104 and determines whether the packets are of interest. If a packet is of interest, voice packet capture module 202 stores the packet and its associated arrival characteristics in a memory 212. For example, voice packet capture module 202 may store the packet and its associated arrival characteristics in a location 214 of memory 212. Voice packet capture module 202 continues to examine packets and store those of interest in memory 212 until a sufficient number of packets has been received. A sufficient number of packets may be received, for example, if there are no more packets in a voice stream, if memory 212 is full, if a predetermined amount of time has elapsed, or if echo assessment module 106 detects a call signaling protocol message (such as an H.323, SIP, MGCP, or SCCP message) indicating that a call has ended.

In a particular embodiment, voice packet capture module 202 may include a communication interface, such as a network interface card, a transceiver, a modem, and/or a port. Voice packet capture module 202 may also include a processor operating according to logical instructions, such as a microprocessor, a field programmable gate array (FPGA), an application specific integrated circuit (ASIC), and/or any other type of device for manipulating data in a logical manner. The instructions for the processor could be stored in memory 212. Memory 212 may include random access memory (RAM), compact-disk memory (CD-RW), registers, and/or any other type of volatile or non-volatile data storage device or devices. In general, voice packet capture module 202 may be any type of device that can receive, examine, and store packets from network 104.

DSP modules 204 are coupled to voice packet capture module 202. Each DSP module 204 retrieves a subset of the packets stored in memory 212 and extracts the voice data contained in the packets. In one embodiment, each DSP module 204 retrieves the packets associated with a different voice packet stream. In a particular embodiment, one DSP module 204 processes packets contained in an upstream voice channel (originating at a particular endpoint 102), and the other DSP module 204 processes packets contained in a downstream voice channel (destined for the particular endpoint 102).

After the voice data is depacketized, each DSP module 204 de-jitters and decodes the depacketized voice data to create an audio signal 216. In effect, the packets are processed as if they were actually being processed at a receiving endpoint 102, using the same jitter, packet losses, and/or packet ordering that occurred at the receiving endpoint 102. To accomplish this, DSP module 204 may determine the type of encoding used on the voice data in the packets, apply a jitter buffer to the packets, and decode the voice data. DSP module 204 may also discard packets if they are too far out of order. In a particular embodiment, upstream DSP module 204a generates an upstream audio signal 216a, and downstream DSP module 204b generates a downstream audio signal 216b. In this way, each DSP module 204 attempts to recreate, in echo assessment module 106, the audio signals generated at endpoints 102 and provided to users. In one embodiment, DSP module 204 represents one or more software routines that emulate the behavior of an endpoint 102.

Filter 206 is coupled to DSP modules 204. Filter 206 receives the audio signals 216 generated by DSP modules 204 and identifies any echo contained in the signals 216. For example, filter 206 may determine whether the signal 216b from downstream DSP module 204 contains at least a portion of the signal 216a from upstream DSP module 204 and/or vice versa. An echo occurs when audible information appears in one audio signal 216 and then appears later in the other audio signal 216. If an echo does exist in signals 216, filter 206 outputs an echo signal 218 that represents the echo contained in the signals 216. In one embodiment, filter 206 represents an adaptive Finite Impulse Response (FIR) filter. In a particular embodiment, filter 206 represents a normalized least mean squared (NLMS) adaptive FIR filter.

Delay estimator 208 is coupled to upstream DSP module 204 and filter 206. Delay estimator 208 receives the echo signal 218 produced by filter 206. Delay estimator 208 also receives the audio signal 216a produced by the upstream DSP module 204. Delay estimator 208 determines the amount of time that elapses between voice information appearing in the signal 216a and the same information appearing as an echo in echo signal 218. In one embodiment, delay estimator 208 uses a cross-correlation function using the signal 216a and echo signal 218 to identify the delay.

Echo assessor 210 is coupled to filter 206 and delay estimator 208. Echo assessor 210 receives the echo signal 218 from filter 206 and the measured delay determined by delay estimator 208. Echo assessor 210 uses the measured delay and the echo signal 218 to generate an echo annoyance index. In one embodiment, echo assessor 210 measures the average amplitude of echo signal 218. In a particular embodiment, this represents the Talker Echo Loudness Rating (TELR) for the echo signal 218. Echo assessor 210 then uses the measured delay and amplitude to access an amplitude-delay table, such as the table shown in FIG. 3. Echo assessor 210 uses the table to identify the echo annoyance index.

Although FIG. 2 illustrates one example of an echo assessment module 106, various changes may be made to echo assessment module 106. For example, a single DSP module 204 could be used in echo assessment module 106. Also, FIG. 2 illustrates one functional division of echo assessment module 106. Various components of echo assessment module 106 could be omitted or combined and other components can be added according to particular needs. Further, other embodiments of echo assessment module 106 could be used in system 100.

FIG. 3 illustrates example amplitude-delay curves 300a and 300b used to identify an echo annoyance index. The curves 300 illustrated in FIG. 3 are for illustration only. Other curve or curves 300 may be used without departing from the scope of this disclosure.

In FIG. 3, curve 300a identifies the level of delay 302 that would be acceptable to most users of system 100 based on the amplitude 304 of the echo. Curve 300b identifies the level of delay 302 that would be unacceptable to most users of system 100 based on the amplitude 304 of the echo. As an example, given an amplitude 304 of 30 decibels, most users would find a delay 302 of 18 milliseconds acceptable, while most users would find a delay 302 of 30 milliseconds unacceptable.

Echo assessment module 106 may use curves 300 to identify the echo annoyance index associated with a communication session. For example, curves 300 may define three different echo annoyance indexes 308. If the measured delay 302 and amplitude 304 reside above curve 300a, the communication session has an echo annoyance index 308a. This indicates that most users in system 100 would find the echo acceptable. If the measured delay 302 and amplitude 304 reside below curve 300b, the communication session has an echo annoyance index 308c. This indicates that most users in system 100 would find the echo unacceptable. If the measured delay 302 and amplitude 304 reside between curves 300, the communication session has an echo annoyance index 308b. This indicates that some users in system 100 would find the echo acceptable, while some users would find the echo unacceptable.

Although FIG. 3 illustrates one example of amplitude-delay curves 300 used to identify an echo annoyance index 308, various changes may be made to FIG. 3. For example, any other suitable curve or curves 300 can be used by echo assessment module 106.

FIGS. 4A through 4D illustrate an example echo assessment using dual tone multi-frequency (DTMF) signals. The frequency diagrams illustrated in FIGS. 4A through 4D are for illustration only. Any other suitable signals can be used in system 100 without departing from the scope of this disclosure.

Figure 4A:
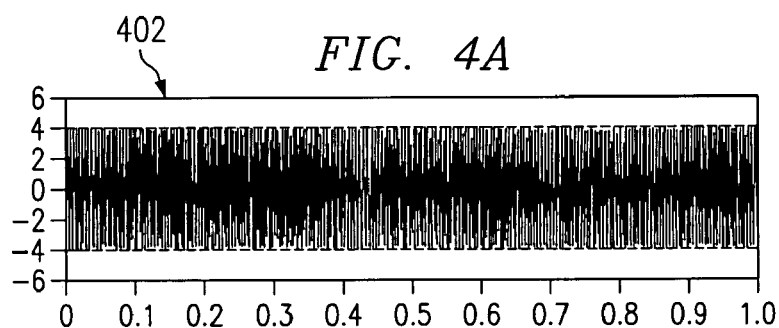
FIGS. 4A through 4D illustrate an example echo assessment using dual tone multi-frequency (DTMF) signals.

Regarding FIG. 4A, a test signal is generated using three sequential DTMF tones. In a particular embodiment, the DTMF tones correspond to the "3," "5," and "9" keys of a telephone forming an endpoint 102. The test signal is then delayed for 50 milliseconds and attenuated by 14 decibels. The test signal is further corrupted with white noise, producing test signal 402 shown in FIG. 4A. This test signal 402 is sent from a transmitting endpoint 102 to a receiving endpoint 102.

Figure 4B:
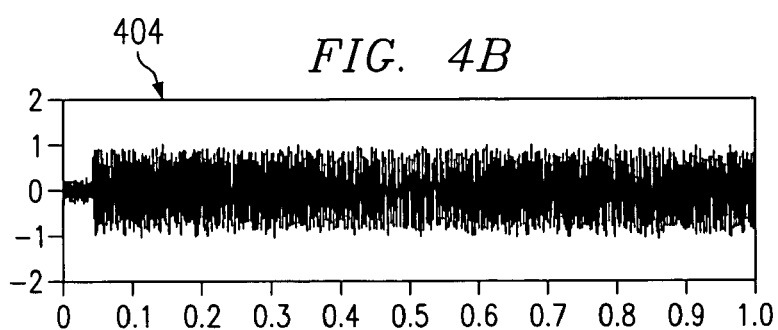
Figure 4C:
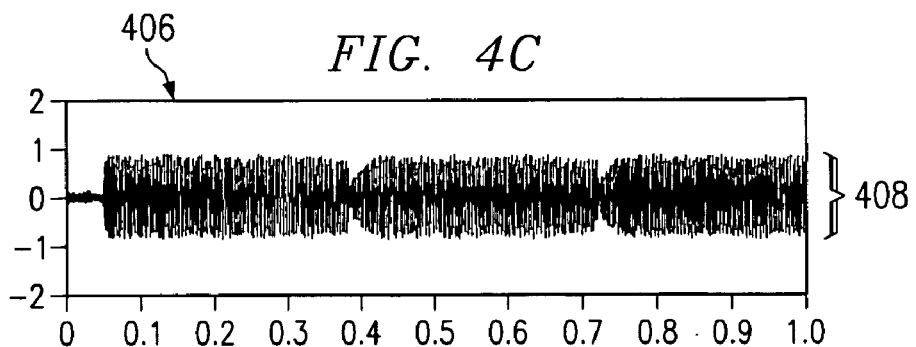

A return signal 404, shown in FIG. 4B, is received at transmitting endpoint 102 from the receiving endpoint 102. The return signal 404 contains an echo of test signal 402, meaning that return signal 404 contains at least a portion of test signal 402. Echo assessment-module 106 receives packets containing the test signal 402 and the return signal 404. Filter 206 of echo assessment module 106 generates an echo signal 406, shown in FIG. 4C, using the two signals 402, 404. As shown in FIG. 4C, echo signal 406 has an average amplitude 408. In one embodiment, echo assessor 210 could receive echo signal 406, identify amplitude 408, and identify the echo annoyance level using the amplitude 408.

Figure 4D:
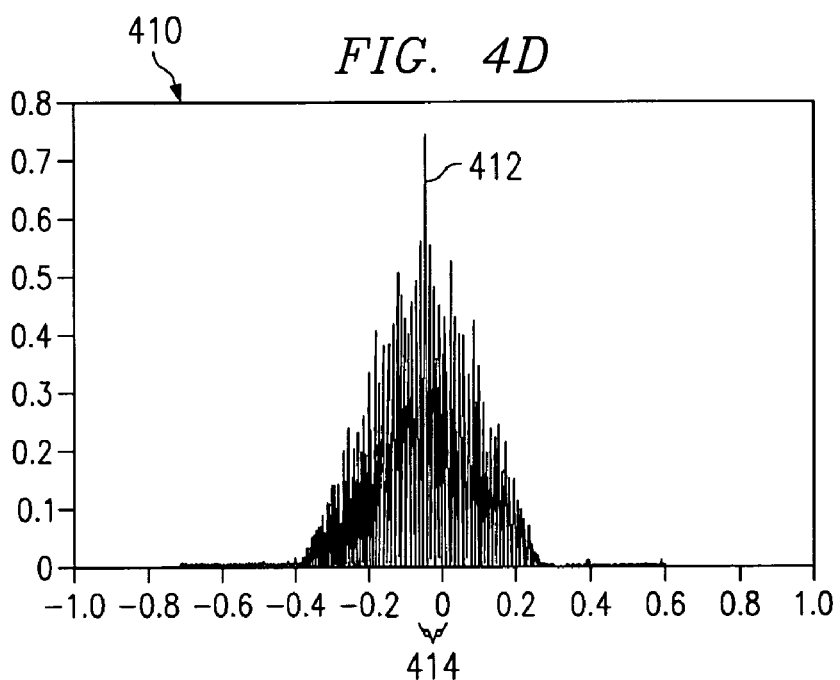

Echo assessor 210 also uses the delay of the echo signal 406 to identify the echo annoyance level. In a particular embodiment, delay estimator 208 uses a cross-correlation function involving echo signal 406 and test signal 402 to identify the delay. In particular, delay estimator 208 may generate a signal distribution or pattern 410, which is shown in FIG. 4D. In FIG. 4D, the largest amplitude 412 of signal pattern 410 is identified. The delay 414 can then be determined by identifying the magnitude of the time associated with the largest amplitude 412. Delay estimator 208 then communicates the identified delay 414 to echo assessor 210, and echo assessor 210 uses the identified delay 414 to identify the echo annoyance level.

Although FIGS. 4A through 4D illustrate an example echo assessment using DTMF signals, various changes may be made to FIGS. 4A through 4D. For example, the frequency patterns shown are for illustration only. Signals having other frequency patterns can be used in system 100.

FIGS. 5A through 5D illustrate an example echo assessment using human voice signals. The diagrams illustrated in FIGS. 5A through 5D are for illustration only. Any other suitable signals can be used in system 100 without departing from the scope of this disclosure.

Figure 5A:
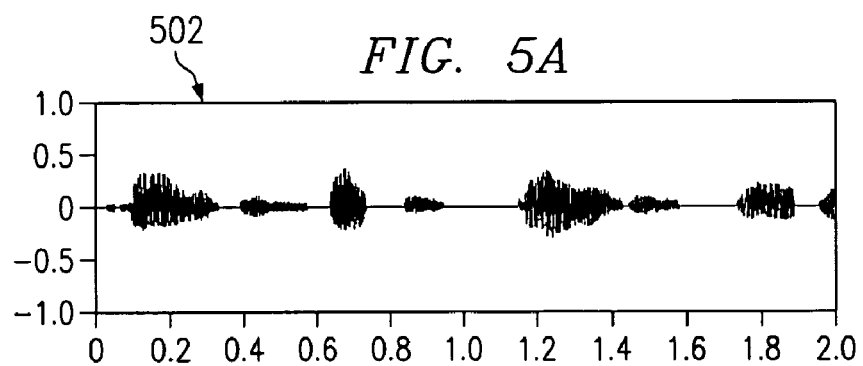
FIGS. 5A through 5D illustrate an example echo assessment using human voice signals.
Figure 5B:
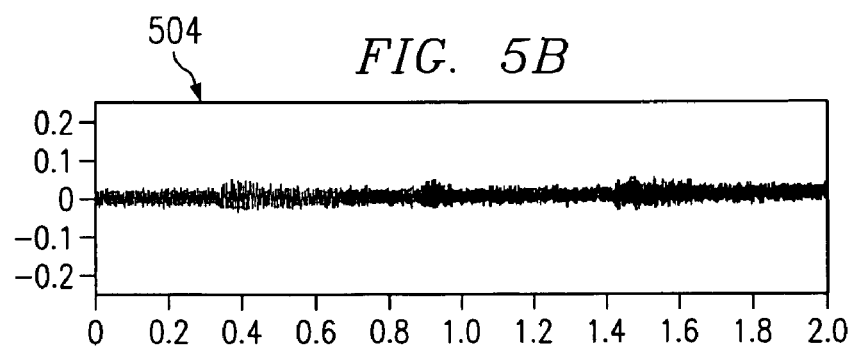

As shown in FIG. 5A, a human voice signal 502 is communicated from a transmitting endpoint 102 to a receiving endpoint 102. A return signal 504, shown in FIG. 5B, is received at the transmitting endpoint 102 from the receiving endpoint 102. The return signal 504 contains an echo of the human voice signal 502.

Figure 5C:
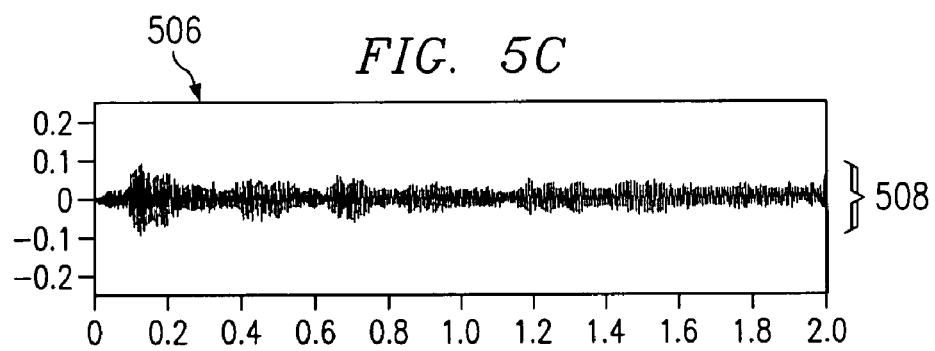
Figure 5D:
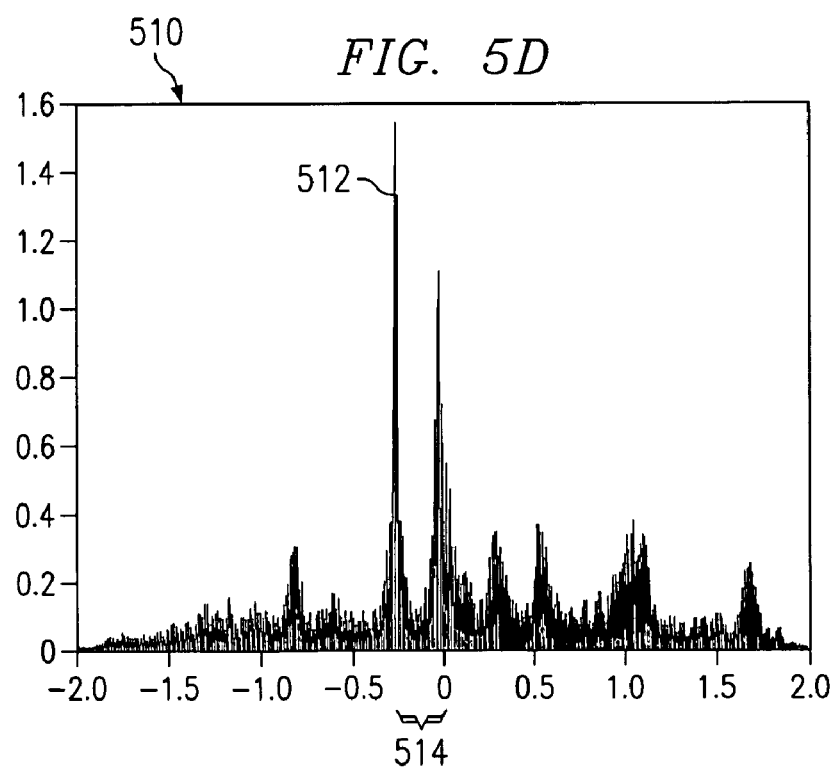

Echo assessment module 106 receives packets containing the human voice signal 502 and the return signal 504, and filter 206 generates echo signal 506 shown in FIG. 5C. As shown in FIG. 5C, echo signal 506 has an average amplitude 508. Delay estimator 208 also receives echo signal 506 and the human voice signal 502. Using a cross-correlation function, delay estimator 208 generates a signal distribution or pattern 510, which is shown in FIG. 5D. In FIG. 5D, the largest amplitude 512 of signal pattern 510 is identified. The delay 514 can then be determined by identifying the magnitude of the time associated with the largest amplitude 512. Delay estimator 208 then communicates the identified delay 514 to echo assessor 210. Echo assessor 210 uses the identified delay 514 and the amplitude 508 to identify the echo annoyance level.

Although FIGS. 5A through 5D illustrate an example echo assessment using human voice signals, various changes may be made to FIGS. 5A through 5D. For example, the frequency patterns shown are for illustration only. Signals having other frequency patterns can be used in system 100.

FIG. 6 illustrates an example method 600 for echo assessment in a communication network. While method 600 is described with respect to system 100 of FIG. 1, method 600 could also be used in any other suitable system.

Echo assessment module 106 captures packets in two or more packet voice streams at step 602. This may include, for example, echo assessment module 106 tapping a shared medium. This may also include voice packet capture module 202 capturing the packets and storing packets of interest in memory 212.

Echo assessment module 106 reconstructs audio signals using the captured packets at step 604. This may include, for example, DSP modules 204 retrieving the captured packets from memory 212. This may also include DSP modules 204 depacketizing voice data contained in the packets. This may further include DSP modules 204 decoding and de-jittering the voice data to create audio signals 216. In this way, echo assessment module 106 may identify echo problems in system 100 in a non-intrusive manner. For example, a device need not, but may if desired, be transported to an endpoint 102 to generate voice data used during the test.

Echo assessment module 106 determines whether an echo from one voice signal 216 is present in another voice signal 216 at step 606. This may include, for example, filter 206 of echo assessment module 106 comparing audio signals 216. Filter 206 produces an echo signal 218 during the comparison. If any echo is present, echo assessment module 106 measures or otherwise classifies the echo contained in the audio signals 216 at step 608. One example of classifying an echo is shown in FIG. 7, which is described below. The measured echo can then be used in any suitable manner. For example, the measured echo can be provided to a network administrator or other personnel for use in adjusting network 104. The measured echo could also be provided to an automated tool that can adjust network 104. The measured echo could further be stored for later use.

Although FIG. 6 illustrates one example of a method 600 for echo assessment in a communication network, various changes may be made to method 600. For example, another component of system 100 could capture packets for echo assessment module 106 and/or reconstruct the audio signals 216. Also, while method 600 shows step 608 being skipped if no echo is present in the voice signals 216, step 608 could always be performed when method 600 is executed.

FIG. 7 illustrates an example method 700 for classifying echo in a communication network. While method 700 is described with respect to system 100 of FIG. 1, method 700 could also be used in any other suitable system.

Echo assessment module 106 measures the amplitude of an echo signal at step 702. This may include, for example, echo assessor 210 or other component of echo assessment module 106 identifying the amplitude of echo signal 218. Echo assessment module 106 measures the delay of the echo signal at step 704. This may include, for example, delay estimator 208 receiving echo signal 218 and a voice signal 216a. This may also include delay estimator 208 identifying the delay between information in signal 216a and the echo of that information in echo signal 218 using a cross-correlation function.

Echo assessment module 106 generates an echo annoyance index using the measured amplitude and delay at step 706. This may include, for example, echo assessor 210 using curves 300 from FIG. 3 to identify the echo annoyance index 308 associated with the measured amplitude and delay.

Although FIG. 7 illustrates one example of a method 700 for measuring echo in a communication network, various changes may be made to method 700. For example, another component of system 100 could measure the amplitude and delay of the echo signal. Also, other or additional characteristics could be used to generate the echo annoyance index.

While this disclosure has been described in terms of certain embodiments and generally associated methods, alterations and permutations of the embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for communicating voice data, comprising:
   receiving a plurality of packets from at least two voice packet streams at a first location;
   storing at least one packet from a first voice packet stream and at least one packet from a second voice packet stream at the first location;
   compensating at least partially at least a portion of the packets of the first voice packet stream for a first jitter amount associated with a destination of the first voice packet stream;
   compensating at least partially at least a portion of the packets of the second voice packet stream for a second jitter amount associated with a destination of the second voice packet stream;
   extracting voice data from the first voice packet stream and the second voice packet stream after at least a portion of the packets of the first voice packet stream and at least a portion of the packets of the second voice packet stream have been compensated for jitter;
   generating, at the first location, a first voice signal from voice data extracted from the first voice packet stream;
   generating, at the first location, a second voice signal from voice data extracted from the second voice packet stream;
   comparing the first voice signal to the second voice signal; and
   identifying an echo of one of the voice signals in at least one other of the voice signals based on a comparison of the first voice signal and the second voice signal.

2. The method of claim 1, further comprising identifying an echo annoyance index associated with the identified echo.

3. The method of claim 2, further comprising identifying an amplitude and a delay associated with the identified echo; and
   wherein identifying the echo annoyance index comprises identifying the echo annoyance index using the amplitude and the delay.

4. The method of claim 3, wherein identifying the delay comprises:
   generating a signal distribution using a cross-correlation function with the identified echo and one of the voice signals;
   identifying a maximum amplitude in the signal distribution; and
   identifying a time associated with the maximum amplitude, a magnitude of the time representing the delay.

5. The method of claim 2, wherein identifying the echo annoyance index comprises identifying the echo annoyance index using at least one International Telecommunication Union—Telecommunications (ITU-T) G.131 amplitude-delay curve.

6. The method of claim 1, wherein receiving the plurality of packets comprises tapping a shared medium used by the at least two voice packet streams.

7. The method of claim 1, wherein receiving the plurality of packets comprises:
   determining whether a packet is of interest; and
   retaining the packet if it is of interest.

8. The method of claim 7, wherein determining whether a packet is of interest comprises examining a destination address of the packet.

9. The method of claim 1, wherein generating one of the voice signals comprises
   decoding the extracted voice data.

10. The method of claim 1, wherein identifying the echo comprises supplying the at least two voice signals to an adaptive filter, the filter operable to generate a signal identifying the echo.

11. The method of claim 1, wherein the at least two voice packet streams comprise an upstream channel and a downstream channel for a telephone call.

12. The method of claim 1, further comprising tapping at least one of a network node, an endpoint, and a wireless link to receive the packets.

13. The method of claim 1, wherein the packets comprise at least one of Internet Protocol packets, frame relay frames, and Asynchronous Transfer Mode cells.

14. The method of claim 1, wherein one or more endpoints generate the at least two voice packet streams without using test equipment at the one or more endpoints.

15. Logic embodied on at least one computer readable medium and operable when executed to:
   receive a plurality of packets from at least two voice packet streams at a first location;
   store at least one packet from a first voice packet stream and at least one packet from a second voice packet stream at the first location;
   compensate at least partially at least a portion of the packets of the first voice packet stream for a first jitter amount associated with a destination of the first voice packet stream;

compensate at least partially at least a portion of the packets of the second voice packet stream for a second jitter amount associated with a destination of the second voice packet stream;

extract voice data from the first voice packet stream and the second voice packet stream after at least a portion of the packets of the first voice packet stream and at least a portion of the packets of the second voice packet stream have been compensated for jitter;

generate, at the first location, a first voice signal from voice data extracted from the first voice packet stream;

generate, at the first location, a second voice signal from voice data extracted from the second voice packet stream;

compare the first voice signal to the second voice signal; and identify an echo of one of the voice signals in at least one other of the voice signals based on a comparison of the first voice signal and the second voice signal.

16. The logic of claim 15, wherein the logic is further operable to identify an echo annoyance index associated with the identified echo.

17. The logic of claim 16, wherein:
the logic is further operable to identify an amplitude and a delay associated with the identified echo; and
the logic is operable to identify the echo annoyance index using the amplitude and the delay.

18. The logic of claim 17, wherein the logic is operable to identify the delay by:
generating a signal distribution using a cross-correlation function with the identified echo and one of the voice signals;
identifying a maximum amplitude in the signal distribution; and
identifying a time associated with the maximum amplitude, a magnitude of the time representing the delay.

19. The logic of claim 15, wherein the logic is operable to receive the plurality of packets by tapping a shared medium used by the at least two voice packet streams, the shared medium forming at least a part of a network node, an endpoint, or a wireless link.

20. The logic of claim 15, wherein the logic is operable to receive the plurality of packets by:
determining whether a packet is of interest; and
retaining the packet if it is of interest.

21. The logic of claim 15, wherein the logic is operable to generate one of the voice signals by
decoding the extracted voice data.

22. The logic of claim 15, wherein the logic is operable to identify the echo by supplying the at least two voice signals to a finite impulse response filter, the filter operable to generate a signal identifying the echo.

23. A system for communicating voice data, comprising:
a voice packet capture module operable to receive packets in at least two voice packet streams;
at least one processing module operable to:
receive the packets;
store at least one packet from a first voice packet stream and at least one packet from a second voice packet stream in a memory associated with the processing module;
compensate at least partially at least a portion of the packets of the first voice packet stream for a first jitter amount associated with a destination of the first voice packet stream;
compensate at least partially at least a portion of the packets of the second voice packet stream for a second jitter amount associated with a destination of the second voice packet stream;

extract voice data from the first voice packet stream and the second voice packet stream after at least a portion of the packets of the first voice packet stream and at least a portion of the packets of the second voice packet stream have been compensated for jitter;

generate, at the first location, a first voice signal from voice data extracted from the first voice packet stream; and generate, at the first location, a second voice signal from voice data extracted from the second voice packet stream; and a filter operable to compare the first voice signal to the second voice signal and to identify an echo of one of the voice signals in at least one other of the voice signals based on a comparison of the first voice signal and the second voice signal.

24. The system of claim 23, further comprising an echo assessor module operable to identify an echo annoyance index associated with the identified echo.

25. The system of claim 24, wherein the echo assessor module is operable to identify the echo annoyance index using an amplitude and a delay associated with the identified echo.

26. The system of claim 25, further comprising a delay module operable to identify the delay associated with the identified echo.

27. The system of claim 23, wherein the voice packet capture module is operable to receive the plurality of packets by tapping a shared medium used by the at least two voice packet streams, the shared medium forming at least a part of a network node, an endpoint, or a wireless link.

28. The system of claim 23, wherein the at least one processing module is operable to generate one of the voice signals by
decoding the extracted voice data.

29. A system for communicating voice data, comprising:
a memory operable to store a plurality of packets from at least two voice packet streams; and
one or more processors collectively operable to:
compensate at least partially at least a portion of the packets of a first voice packet stream for a first jitter amount associated with a destination of the first voice packet stream;
compensate at least partially at least a portion of the packets of a second voice packet stream for a second jitter amount associated with a destination of the second voice packet stream;
extract voice data from the first voice packet stream and the second voice packet stream after at least a portion of the packets of the first voice packet stream and at least a portion of the packets of the second voice packet stream have been compensated for jitter;
generate, at the first location, a first voice signal from voice data extracted from the first voice packet stream;
generate, at the first location, a second voice signal from voice data extracted from the second voice packet stream;
compare the first voice signal to the second voice signal; and
identify an echo of one of the voice signals in at least one other of the voice signals based on a comparison of the first voice signal and the second voice signal.

30. The system of claim 29, wherein the one or more processors are further collectively operable to identify an echo annoyance index associated with the identified echo.

31. The system of claim 30, wherein the one or more processors are collectively operable to identify the echo annoyance index using an amplitude and a delay associated with the identified echo.

32. The system of claim 31, wherein the one or more processors are further collectively operable to identify the amplitude and the delay associated with the identified echo.

33. The system of claim 32, wherein the one or more processors are collectively operable to identify the delay by:
generating a signal distribution using a cross-correlation function with the identified echo and one of the voice signals;
identifying a maximum amplitude in the signal distribution; and
identifying a time associated with the maximum amplitude, a magnitude of the time representing the delay.

34. The system of claim 29, wherein the one or more processors are collectively operable to receive the plurality of packets by tapping a shared medium used by the at least two voice packet streams, the shared medium forming at least a part of a network node, an endpoint, or a wireless link.

35. The system of claim 29, wherein the one or more processors are collectively operable to generate one of the voice signals by
decoding the extracted voice data.

36. A system for communicating voice data, comprising:
means for receiving a plurality of packets from at least two voice packet streams at a first location;
means for storing at least one packet from a first voice packet stream and at least one packet from a second voice packet stream at the first location;
means for compensating at least partially at least a portion of the packets of the first voice packet stream for a first litter amount associated with a destination of the first voice packet stream;
means for compensating at least partially at least a portion of the packets of the second voice packet stream for a second jitter amount associated with a destination of the second voice packet stream;
means for extracting voice data from the first voice packet stream and the second voice packet stream after at least a portion of the packets of the first voice packet stream and at least a portion of the packets of the second voice packet stream have been compensated for litter;
means for generating, at the first location, a first voice signal from voice data extracted from the first voice packet stream;
means for generating, at the first location, a second voice signal from voice data extracted from the second voice packet stream,
means for comparing the first voice signal to the second voice signal;
means for identifying an echo of one of the voice signals in at least one other of the voice signals based on a comparison of the first voice signal and the second voice signal; and
means for identifying an echo annoyance index associated with the identified echo.

* * * * *

UNITED STATES PATENT AND TRADEMARK OFFICE
CERTIFICATE OF CORRECTION

PATENT NO. : 6,952,473 B1  Page 1 of 1
APPLICATION NO. : 10/304147
DATED : October 4, 2005
INVENTOR(S) : Yueh-ju Lee It is certified that error appears in the above-identified patent and that said Letters Patent is hereby corrected as shown below:

Column 14, Line 6, delete "litter" and insert -- jitter --.
Column 14, Line 16, delete "litter" and insert -- jitter --.
Column 14, Line 22, after "packet stream" delete "," and insert -- ; --.

Signed and Sealed this

Second Day of January, 2007

JON W. DUDAS
*Director of the United States Patent and Trademark Office*